United States Patent
Li et al.

(10) Patent No.: US 11,803,409 B2
(45) Date of Patent: Oct. 31, 2023

(54) MOBILE EDGE COMPUTING METHOD AND APPARATUS

(71) Applicants: Huawei Technologies Co., Ltd., Shenzhen (CN); Tsinghua University, Beijing (CN)

(72) Inventors: Yong Li, Beijing (CN); Huan Yan, Beijing (CN); Yu Liu, Beijing (CN); Longyu Cao, Shenzhen (CN); Depeng Jin, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 483 days.

(21) Appl. No.: 17/099,436

(22) Filed: Nov. 16, 2020

(65) Prior Publication Data

US 2021/0073022 A1    Mar. 11, 2021

Related U.S. Application Data

(63) Continuation of application No. PCT/CN2019/086716, filed on May 13, 2019.

(30) Foreign Application Priority Data

May 16, 2018 (CN) .......................... 201810470173.8

(51) Int. Cl.
*H04W 36/14* (2009.01)
*G06F 9/455* (2018.01)
*H04W 36/00* (2009.01)

(52) U.S. Cl.
CPC ..... *G06F 9/45558* (2013.01); *H04W 36/0011* (2013.01); *H04W 36/14* (2013.01);
(Continued)

(58) Field of Classification Search
CPC .......................... H04W 36/0011; H04W 36/14
See application file for complete search history.

(56) References Cited

U.S. PATENT DOCUMENTS

| 2017/0086049 A1 | 3/2017 | Vrzic |
| 2017/0118311 A1 | 4/2017 | Frydman et al. |

(Continued)

FOREIGN PATENT DOCUMENTS

| CN | 105163353 A | 12/2015 |
| CN | 105744575 A | 7/2016 |

(Continued)

OTHER PUBLICATIONS

Deng, "Research on the Task Offloading Strategy Based on Mobile Edge Computing," with English abstract, pp. 1-70, Beijing University of Posts and Telecommunications, Beijing, China (Mar. 10, 2013).

(Continued)

*Primary Examiner* — Barry W Taylor
(74) *Attorney, Agent, or Firm* — Leydig, Voit & Mayer, Ltd.

(57) ABSTRACT

A mobile edge computing method and apparatus are provided. The method which is implemented by a mobile edge computing (MEC) management network element includes: receiving an MEC virtualization resource request sent by a control plane of a target radio access network (RAN), wherein the control plane belongs to the target RAN to which user equipment (UE) is handed over, and the MEC virtualization resource request includes an MEC computing resource requirement of the UE; creating, based on the MEC virtualization resource request, a new virtual machine (VM) on an MEC server for the UE, wherein the new VM is used on the target RAN side after the handover; and sending first information of the new VM to the control plane, wherein the first information includes an ID of the new VM. According (Continued)

to the application, the efficiency of usage of resources during a handover of UE is significantly improved.

14 Claims, 5 Drawing Sheets

(52) U.S. Cl.
 CPC .............. *G06F 2009/45562* (2013.01); *G06F 2009/45595* (2013.01)

(56) References Cited

U.S. PATENT DOCUMENTS

| | | | |
|---|---|---|---|
| 2018/0270720 | A1 | 9/2018 | Shi et al. |
| 2021/0105191 | A1* | 4/2021 | Yang ................... G06F 11/3409 |
| 2021/0160767 | A1* | 5/2021 | Palamara .............. H04W 24/02 |
| 2021/0273987 | A1* | 9/2021 | You ......................... H04L 67/02 |
| 2023/0007457 | A1* | 1/2023 | Kleinrouweler .... H04L 67/1014 |

FOREIGN PATENT DOCUMENTS

| | | |
|---|---|---|
| CN | 106534333 A | 3/2017 |
| CN | 106851738 A | 6/2017 |
| CN | 107172666 A | 9/2017 |
| CN | 107370799 A | 11/2017 |
| CN | 108028783 B | 7/2020 |
| WO | 2017066945 A1 | 4/2017 |
| WO | 2017129742 A1 | 8/2017 |
| WO | 2017187011 A1 | 11/2017 |
| WO | 2017211377 A1 | 12/2017 |

OTHER PUBLICATIONS

Bao et al., "Follow Me Fog: Toward Seamless Handover Timing Schemes in a Fog Computing Environment," IEEE Communications Magazine, vol. 55, No. 11, pp. 72-78, Institute of Electrical and Electronics Engineers, New York, New York (Nov. 2017).
Bellavista et al., "A migration-enhanced edge computing support for mobile devices in hostile environments," 2017 13th International Wireless Communications and Mobile Computing Conference (IWCMC), Valencia, Spain, pp. 957-962, Institute of Electrical and Electronics Engineers, New York, New York (Jun. 26-30, 2017).
Wang et al., "MobiScud: A Fast Moving Personal Cloud in the Mobile Network", All Things Cellular: Operations, Applications and Challenges, ACM, 2 Penn Plaza, Suite 701 New York NY 10121-0701 USA, XP058071149, pp. 19-24, (Aug. 7, 2015).
"Mobile Edge Computing (MEC); End to End Mobility Aspects", pp. 1-54, XP014322893 (Aug. 21, 2017).

\* cited by examiner

MOBILE EDGE COMPUTING METHOD AND APPARATUS

CROSS-REFERENCE TO RELATED APPLICATIONS

This application is a continuation of International Application No. PCT/CN2019/086716, filed on May 13, 2019, which claims priority to Chinese Patent Application No. 201810470173.8, filed on May 16, 2018. The disclosures of the aforementioned applications are hereby incorporated by reference in their entireties.

TECHNICAL FIELD

Embodiments of this application relate to the field of information technologies, and in particular, to a mobile edge computing method and apparatus.

BACKGROUND

As a quantity of intelligent mobile devices continuously increases and various new service types emerge, traditional cloud computing technologies cannot meet increasing service requirements. Therefore, the European Telecommunications Standards Institute (ETSI) proposes a concept of mobile edge computing (MEC). Mobile edge computing distributes computing capabilities to distributed base stations and provides, at an edge of a mobile network, capabilities approximating to cloud computing, storage, and processing. As a key technology for evolution of a 5th-generation (5-generation, 5G) mobile communications network architecture, MEC is capable of meeting various requirements of a system on a throughput, a latency, network scalability, intelligence, and the like.

In an existing MEC technology, because an MEC server switches when a user moves and a UE handover occurs, the following method is used to ensure service continuity: predicting, on a cloud, a location of the user at a next moment based on a historical location record, of the user, that is collected on the cloud; searching for, based on a prediction result and a computing resource and a virtualization function that are needed by the user, a new MEC server that meets a condition; and preconfiguring a new virtual machine (VM) on the new MEC server. After the user moves, the MEC server detects that the configured new virtual machine is available, and sends a corresponding internet protocol (IP) address and port number to the user, so that the new virtual machine serves the user. However, a disadvantage of the method in the prior art is that when the location of the user at the next moment is predicted based on historical locations of the user that are recorded on the cloud, accuracy of the prediction cannot be ensured, and a prediction error may occur. When the prediction error occurs, a redundant virtual machine is created, and consequently, a waste of resources is caused. Especially when a large quantity of users access an MEC server at the same time, due to such a waste of resources, some users cannot use the MEC server. Consequently, user experience deteriorates.

In conclusion, a problem that needs to be resolved currently is how to reduce the waste of resources when the user moves and the UE handover occurs.

SUMMARY

This application provides a mobile edge computing method and apparatus, to resolve a problem in the prior art that resources are wasted when a user moves and a UE handover occurs.

According to a first aspect, this application provides a mobile edge computing method. The method includes: receiving, by a mobile edge computing MEC management network element, an MEC virtualization resource request sent by a control plane of a target radio access network RAN, where the control plane of the target RAN belongs to the target RAN to which user equipment is handed over, and the MEC virtualization resource request includes an MEC computing resource requirement of the user equipment; creating, by the MEC management network element based on the MEC virtualization resource request, a new virtual machine VM on an MEC server for the user equipment, where the new VM is a VM used on the target RAN side after the user equipment is handed over; and sending, by the MEC management network element, first information of the new VM to the control plane of the target RAN, where the first information includes an ID of the new VM.

Compared with the prior art, in the foregoing method, the MEC management network element for managing a virtualization resource of the MEC server is added, and the MEC management network element creates, based on the received MEC virtualization resource request sent by the control plane of the RAN, the new VM on the virtualization resource of the MEC server for the user equipment, to continue to provide an MEC application service for the user equipment on the new VM. In addition, the MEC management network element sends the first information of the new VM to the control plane of the target RAN. In this way, when the user equipment is handed over in a process of using the MEC application, the user equipment can be automatically handed over to the new VM on the target RAN side without affecting service continuity. This reduces a transmission latency and improves user experience.

In a possible design, the MEC management network element receives an MEC VM working status query request sent by the control plane of the target RAN, where the MEC VM working status query request includes the ID of the new VM; the MEC management network element queries for status information of the new VM based on the ID of the new VM, where the status information includes a startup state and a normal state; and the MEC management network element sends the status information of the new VM to the control plane of the target RAN.

According to the method, the MEC management network element queries for the status information of the new VM based on the ID, of the new VM, that is carried in the MEC VM status information query request sent by the control plane of the target RAN, and sends the status information of the new VM to the control plane of the target RAN. The control plane of the target RAN determines, based on the received status information of the new VM, whether to replace an old VM with the new VM.

In a possible design, the MEC management network element receives a VM status event reported by the MEC server, where the VM status event includes a correspondence between the ID of the new VM and the status information of the VM.

According to the method, when a status of a VM on the MEC server changes, the MEC management network element may receive a VM status event reported by the MEC server, to facilitate subsequent querying for the status of the VM.

In a possible design, the MEC management network element receives a data migration message sent by the control plane of the target RAN, where the data migration message is used to indicate the MEC server to replace an old VM with the new VM in performing data exchange between the user equipment and the target RAN, where the old VM is a VM used on a source RAN side before the user equipment is handed over; and the MEC management network element sends the data migration message to the MEC server, to indicate the MEC server to replace the old VM with the new VM in performing data exchange between the user equipment and the target RAN.

According to the method, the MEC management network element starts to perform data migration based on the received data migration message, to be specific, to replace the old VM with the new VM in performing data exchange between the user equipment and the target RAN. Because the new VM that replaces the old VM is preset, the new VM may be directly used to implement data exchange between the user equipment and the target RAN, so that the transmission latency can be reduced.

According to a second aspect, this application provides a mobile edge computing method. The method includes: receiving, by a control plane of a target radio access network RAN, a handover request message sent by a control plane of a source RAN, where the handover request message includes an MEC computing resource requirement of user equipment, the control plane of the target RAN belongs to the target RAN to which the user equipment is handed over, and the control plane of the source RAN belongs to the source RAN from which the user equipment is handed over; sending, by the control plane of the target RAN based on the handover request message, an MEC virtualization resource request to a mobile edge computing MEC management network element, where the MEC virtualization resource request includes the MEC computing resource requirement of the user equipment; and receiving, by the control plane of the target RAN, first information, of a new VM, sent by the MEC management network element, where the new VM is a new VM created, by the MEC management network element based on the MEC virtualization resource request, on an MEC server for the user equipment, the new VM is a VM used on the target RAN side after the user equipment is handed over, and the first information includes an ID of the new VM.

In a possible design, the control plane of the target RAN sends a handover command message to a software-defined networking SDN controller, where the handover command message includes an IP address of the target RAN, and the handover command message is used to indicate to hand over the user equipment from the source RAN side to the target RAN side; and the control plane of the target RAN receives a handover command response message sent by the SDN controller.

In a possible design, the control plane of the target RAN sends an MEC VM working status query request to the MEC management network element, where the MEC VM working status query request includes the ID of the new VM; and the control plane of the target RAN receives status information, of the new VM, sent by the MEC management network element, where the status information includes a startup state and a normal state.

In a possible design, the control plane of the target RAN sends a data forwarding message to the SDN controller, where the data forwarding message is used to indicate the SDN controller to forward data sent to an old VM to the new VM. Specifically, the data forwarding message includes an IP address of the old VM and an IP address of the new VM.

In a possible design, the control plane of the target RAN receives a flow table update complete message sent by the SDN controller, where the flow table update complete message is used to notify the control plane of the target RAN to notify the MEC management network element to perform data migration.

In a possible design, the control plane of the target RAN sends a data migration message to the MEC management network element, where the data migration message is used to indicate the MEC server to replace the old VM with the new VM in performing data exchange between the user equipment and the target RAN, and the old VM is a VM used on the source RAN side before the user equipment is handed over; and the control plane of the target RAN sends RAN forwarding plane flow table update information to the SDN controller, to indicate the SDN controller to indicate a forwarding plane of the target RAN to forward data between the user equipment and the new VM.

According to a third aspect, this application provides a mobile edge computing method. The method includes: receiving, by a software-defined networking SDN controller, a handover command message sent by a control plane of a target RAN, where the handover command message includes an IP address of the target RAN, and the handover command message is used to indicate to hand over user equipment from a source RAN side to the target RAN side; and sending, by the SDN controller, a handover command response message to the control plane of the target RAN.

In a possible design, the SDN controller sends a first packet-out message to the user equipment UE, where the first packet-out message carries data of an RRC reconf message, the RRC reconf message is sent to the UE through a forwarding plane of the target RAN, and the RRC reconf message includes radio resource control RRC parameter configuration information.

In a possible design, the SDN controller receives a data forwarding message sent by the control plane of the target RAN, where the data forwarding message is used to indicate the SDN controller to forward data sent to an old VM to a new VM, the old VM is a VM used on the source RAN side before the user equipment is handed over, and the new VM is a VM used on the target RAN side after the user equipment is handed over. Specifically, the data forwarding message includes an IP address of the old VM and an IP address of the new VM, and is used to indicate the SDN controller to forward the data sent to the old VM to the new VM.

In a possible design, the SDN controller sends a flow table message to a switch between the new VM and the old VM, where the flow table message is used by the switch to indicate the UE to send, to the new VM for processing, MEC application data that is not uploaded, and indicate to send, to the UE, data from the new VM.

In a possible design, the SDN controller sends a flow table update complete message to the control plane of the target RAN, to notify the control plane of the target RAN to notify the MEC management network element to perform data migration.

In a possible design, the SDN controller receives an RAN forwarding plane flow table update message sent by the control plane of the target RAN, where the RAN forwarding plane flow table update message is used to indicate the SDN controller to indicate the forwarding plane of the target RAN to forward data between the user equipment and the new VM.

According to a fourth aspect, this application provides a mobile edge computing apparatus, including a transceiver unit and a processing unit. The transceiver unit and the processing unit may implement, through interaction and cooperation, the method process according to any one of the first aspect and the possible designs of the first aspect.

According to a fifth aspect, this application provides a mobile edge computing apparatus, including a transceiver unit and a processing unit. The transceiver unit and the processing unit may implement, through interaction and cooperation, the method process according to any one of the second aspect and the possible designs of the second aspect.

According to a sixth aspect, this application provides a mobile edge computing apparatus, including a transceiver unit and a processing unit. The transceiver unit and the processing unit may implement, through interaction and cooperation, the method process according to any one of the third aspect and the possible designs of the third aspect.

According to a seventh aspect, an embodiment of this application further provides an apparatus, including a processor, a memory, and a communications interface. The memory is configured to store a computer program, and the processor is configured to read the computer program stored in the memory and implement the method provided in the first aspect, any design of the first aspect, the second aspect, any design of the second aspect, the third aspect, or any design of the third aspect.

According to an eighth aspect, this application further provides a computer-readable storage medium, configured to store a computer software instruction used to perform a function of the first aspect, any design of the first aspect, the second aspect, any design of the second aspect, the third aspect, or any design of the third aspect. The computer software instruction includes a program designed for performing the method in the first aspect, any design of the first aspect, the second aspect, any design of the second aspect, the third aspect, or any design of the third aspect According to a ninth aspect, this application provides a computer program product including an instruction. When the computer program product runs on a computer, the computer is enabled to perform the method in the first aspect, and/or any design of the first aspect, and/or the second aspect, and/or any design of the second aspect, and/or the third aspect, and/or any design of the third aspect.

DESCRIPTION OF EMBODIMENTS

The following further describes in detail embodiments of this application with reference to the accompanying drawings.

The embodiments of this application provide a mobile edge computing method and apparatus, to resolve a problem in the prior art that resources are wasted when user equipment is moved and handed over. The method and the device are based on a same inventive concept. Because a problem-resolving principle of the method is similar to that of the device, mutual reference may be made to implementations of the method and the device, and repeated description is not provided.

Figure 1:
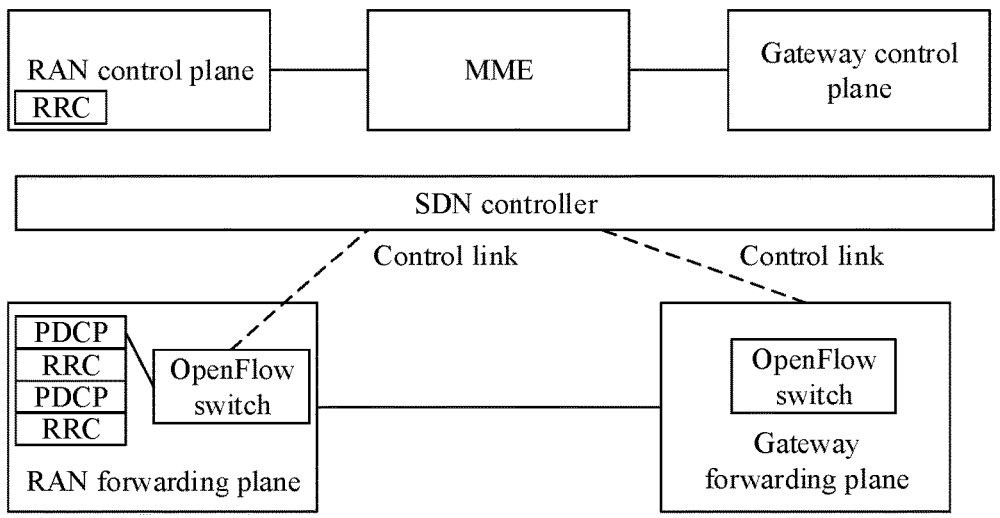
FIG. 1 is a schematic diagram of a network architecture according to this application.

As a quantity of intelligent mobile devices continuously increases, diversified and massive computing services develop into a trend. This requires mobile devices to support more applications that have requirements for a high quantity of computations and a low latency. Traditional cloud computing technologies cannot meet the increasing service requirements. Therefore, the European Telecommunications Standards Institute (ETSI) proposes a concept of mobile edge computing (MEC). Mobile edge computing distributes computing capabilities to distributed base stations and provides, at an edge of a mobile network, capabilities approximating to cloud computing, storage, and processing. As a key technology for evolution of a 5th-generation (5-generation, 5G) mobile communications network architecture, MEC is capable of meeting various requirements of a system on a throughput, a latency, network scalability, intelligence, and the like. MEC can be understood as an edge-based big data processing platform. To be specific, a traditional data center is divided into various small data centers and the small data centers are placed on edge nodes (servers) of a network, to be closer to users, so as to provide faster services for the users and achieve better network performance. However, because MEC introduces a large quantity of edge nodes, the network becomes more complex, and how to implement flexible network control becomes an urgent problem to be resolved. Currently, software-defined networking (SDN) is used to implement flexible network configuration. SDN is a new network architecture. It separates a forwarding plane from a control plane and uses a centralized control plane, thereby greatly improving network flexibility. Specifically, a network architecture model in which the control plane is separated from the forwarding plane is shown in FIG. 1. The control plane includes a radio access network (RAN) control plane, a gateway control plane, a mobility management entity (MME), and an SDN controller.

In an existing MEC technology, because an MEC server switches when a user moves and a UE handover occurs, the following method is used to ensure service continuity: predicting, on a cloud, a location of the user at a next moment based on a historical location record, of the user, that is collected on the cloud; searching for, based on a prediction result and a computing resource and a virtualization function that are needed by the user, a new MEC server that meets a condition; and preconfiguring a new virtual machine (VM) on the new MEC server. After the user moves, the MEC server detects that the configured new virtual machine is available, and sends a corresponding internet protocol (IP) address and port number to the user, so that the new virtual machine serves the user. However, a disadvantage of the method in the prior art is that when the location of the user at the next moment is predicted based on historical locations of the user that are recorded on the cloud, accuracy of the prediction cannot be ensured, and a prediction error may occur. When the prediction error occurs, a redundant virtual machine is created, and consequently, a waste of resources is caused. Especially when a large quantity of users use an MEC application service at the same time, due to such a waste of resources, some users cannot use the MEC application service. Consequently, user experience deteriorates.

The following explains some terms in this application to facilitate understanding by a person skilled in the art.

(1) User equipment (UE), also referred to as a terminal device, a mobile station (MS), a mobile terminal (MT), or the like, is a device providing voice and/or data connectivity for a user, such as a handheld device or a vehicle-mounted device that has a wireless connection function. Currently, some examples of the terminal are: a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, and the like. The UE in this application may be ultra-reliable low-latency communication (URLLC) UE.

(2) A radio access network (RAN) node (or device) is a device that is in a network and that connects a terminal device to a wireless network. The network device is a node in a radio access network, and the network device may also be referred to as a base station (BS). Currently, some examples of the network device are: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a wireless fidelity (Wi-Fi) access point (AP), and the like. In addition, in a network structure, the network device may include a centralized unit (CU) node and a distributed unit (DU) node. In this structure, protocol layers of an eNB in a long term evolution (LTE) system are separated. Functions of some protocol layers are centrally controlled by a CU, and functions of some or all of remaining protocol layers are distributed in DUs. The DUs are centrally controlled by the CU.

(3) A flow table stores rules for processing and forwarding a service packet of the user equipment. Each flow entry in the flow table usually includes three parts: a value of a match field, a processing action, and statistics data. Specifically, the match field specifies values of some or all fields in a packet header of a data packet. After receiving the data packet, a forwarding plane extracts values of fields from the packet header of the data packet, and then matches the values with values in match fields of all flow entries in the flow table, to obtain a successfully matched flow entry. The processing action specifies how to process the successfully matched data packet, and the processing includes forwarding the packet through a port, discarding the packet, and modifying the values of the fields in the packet header. The statistics data includes information such as a quantity of and a total quantity of bytes of data packets processed by using each flow table.

(4) "A plurality of" refers to two or more than two.

In addition, it should be understood that in descriptions of this application, terms such as "first" and "second" are merely used for differentiation and description, but should not be understood as an indication or implication of relative importance or an indication or implication of an order.

Compared with the prior art, in the embodiments of this application, an MEC management network element for managing a virtualization resource of an MEC server is added, and the MEC management network element creates, based on a received MEC virtualization resource request sent by a control plane of an RAN, a new VM on the virtualization resource of the MEC server for user equipment, to continue to provide an MEC application service for the user equipment on the new VM. In addition, the MEC management network element sends first information of the new VM to the control plane of the target RAN. In this way, when the user equipment is handed over in a process of using the MEC application, the user equipment can be automatically handed over to the new VM on the target RAN side without affecting service continuity. This reduces a transmission latency and improves user experience.

Figure 2:
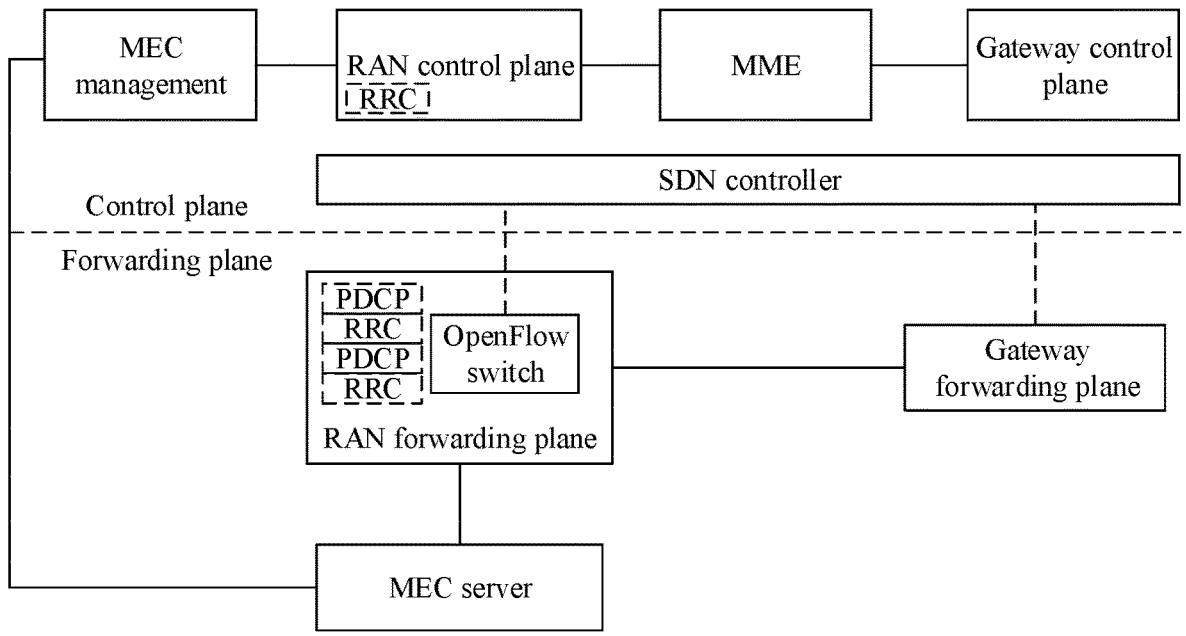
FIG. 2 is a schematic diagram of a new network architecture according to this application.

In an embodiment of this application, a mobile edge computing method is proposed. The method is based on a new mobile communications network architecture that is proposed in this application and that is for implementing MEC. A specific schematic diagram is shown in FIG. 2. An MEC management network element is added to the architecture in FIG. 1, and the MEC management network element is configured to manage a virtualization computing resource on an MEC server. Specifically, FIG. 2 includes an SDN controller, the MEC management network element, an RAN control plane, an MME, a gateway control plane, and an OpenFlow switch. The RAN control plane includes an RAN control plane network element, and the gateway control plane includes a gateway control plane network element. The SDN controller is responsible for managing rules for processing a data packet and forwarding a flow table and a related configuration over a control link between the SDN controller and the switch. The MEC management network element is responsible for managing the virtualization resource on the MEC server, maintaining a working status of the virtualization resource, starting data migration between an old VM and a new VM, and the like. The MEC management network element periodically monitors resource usage on the MEC server, for example, a used resource and/or a remaining resource. The resource refers to a disk capacity, a memory, a CPU, or the like. In addition, the MEC management network element subscribes to a VM working status event from the MEC server. When a status of a VM on the MEC server changes, the MEC server sends a status change notification to the MEC management network element. The RAN control plane is responsible for parsing an MEC application service request message sent by a user, encapsulating a corresponding response message, and notifying the MEC management network element and the SDN controller to execute a procedure related to providing an MEC application service. An RAN forwarding plane is responsible for air interface-oriented data processing (which is performed on a packet data convergence protocol (PDCP) layer, a radio link control (RLC) layer, a media access control (MAC) layer, and a physical (PHY) layer), and core network side-oriented data processing. The MME is responsible for mobility management. The gateway control plane is responsible for selecting a suitable gateway forwarding plane to forward uplink and downlink data. The OpenFlow switch is responsible for processing and forwarding a service packet of user equipment based on the flow table.

Figure 3:
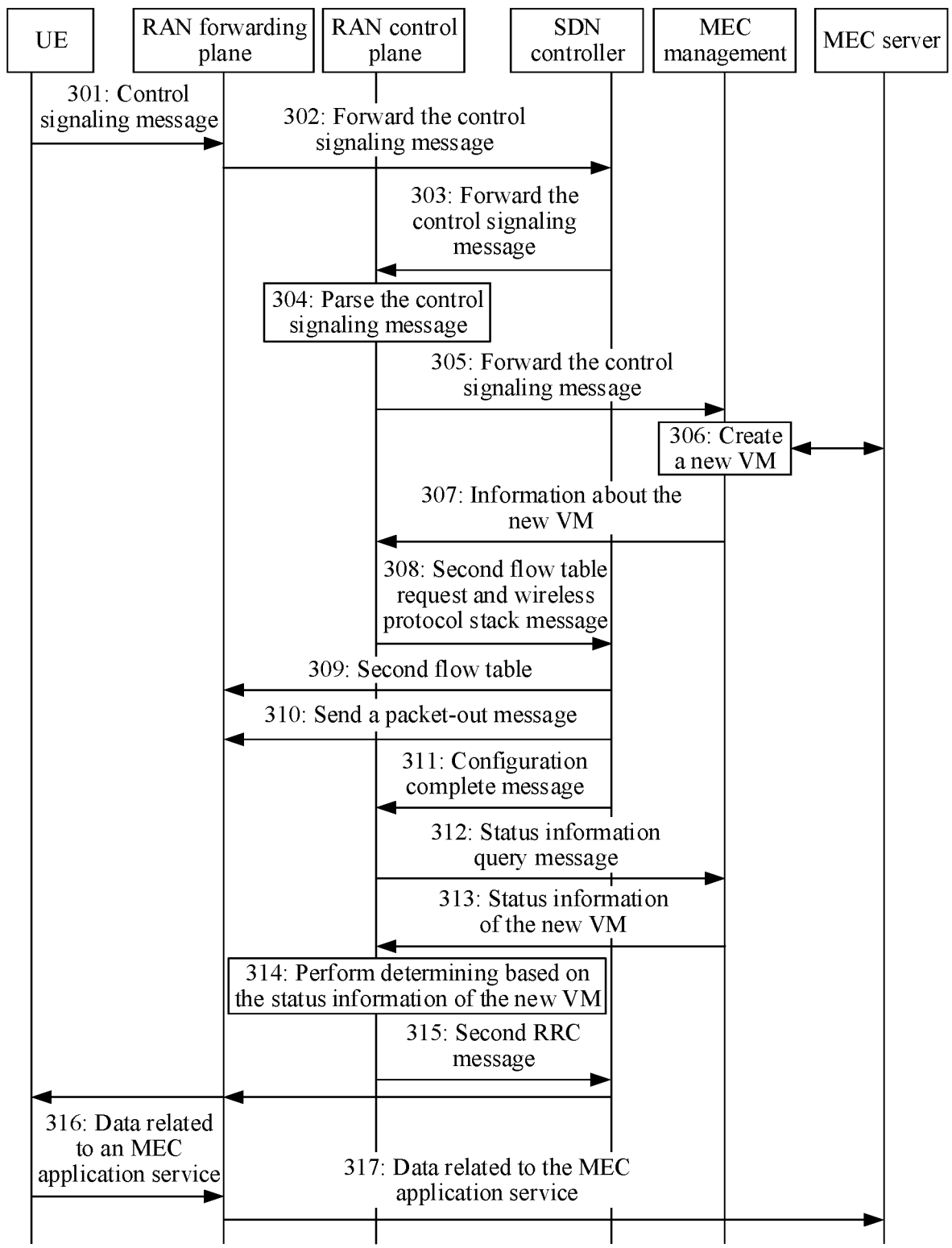
FIG. 3 is a flowchart of a mobile edge computing method according to this application.

On the basis of the new mobile communications network architecture that is proposed in FIG. 2 and that is for implementing MEC, FIG. 3 shows a specific procedure of providing an MEC application service for user equipment when the user equipment initiates an MEC application service request for the first time in the foregoing new network structure. With reference to FIG. 3, the following describes in detail a mobile edge computing method provided in this application. The method includes the following steps.

Step 301: User equipment UE sends a control signaling message to an RAN forwarding plane.

The UE may further request an MEC application service from an MEC management network element by using the control signaling message, where content of the control signaling message includes a UE ID, a cell ID, and MEC computing resource requirement information of the UE, and the MEC computing resource requirement information of the UE may include but is not limited to information about a required central processing unit (CPU) resource size, disk size, and memory size. The control signaling message may be encapsulated in a first radio resource control (RRC) message for transmission. A type field may be added to the first RRC message, and a value of the type field is specifically set to an MEC request type, to indicate that the RRC message is an MEC application service request message.

Step 302: The RAN forwarding plane sends the received control signaling message to an SDN controller through a packet-in message.

For example, the RAN forwarding plane performs matching on the control signaling message in a first flow table configured in a switch, that is, the RAN forwarding plane determines, based on the first flow table, to send the control signaling message to the SDN controller through the packet-in message. A specific match field is a number of a corresponding port for receiving the control signaling message.

Step 303: After receiving the control signaling message, the SDN controller forwards the control signaling message to an RAN control plane.

Step 304: After receiving the control signaling message, the RAN control plane learns, through parsing based on the RRC message type field, that the control signaling message is the MEC application service request message.

Step 305: The RAN control plane forwards the control signaling message to the MEC management network element.

Step 306: After receiving the control signaling request message, the MEC management network element determines, based on current resource usage on an MEC server, whether the user equipment has a corresponding VM; and if the user equipment does not have a corresponding VM, creates a new VM for the user equipment.

Step 307: The MEC management network element sends information about the new VM to the RAN control plane.

Specifically, the information about the new VM may include an ID of the new VM, an IP and a port number of the new VM, and the like.

Step 308: The RAN control plane sends, to the SDN controller, a request for configuring a second flow table and a message for configuring a wireless protocol stack of the RAN forwarding plane.

Specifically, the request for configuring the second flow table includes a UE IP, the IP and the port number of the new VM, and the like.

Step 309: The SDN controller sends the second flow table to the RAN forwarding plane through a flow mod message.

In a possible implementation, the second flow table is configured by the switch, and may be two flow tables. The two flow tables are an uplink flow table and a downlink flow table, the uplink flow table is used to forward, to the new VM, MEC application service data uploaded by the UE, and the downlink flow table is used to return data of the new VM to the UE.

Step 310: The SDN controller sends a packet-out message to the RAN forwarding plane.

The packet-out message includes the message for configuring the wireless protocol stack of the RAN forwarding plane.

Step 311: The SDN controller sends a configuration complete message to the RAN control plane, to notify the RAN control plane that the second flow table and the wireless protocol stack of the RAN forwarding plane have been configured.

Step 312: The RAN control plane sends a status information query message for the new VM to the MEC management network element, where the status information query message for the new VM includes the ID of the new VM.

Step 313: The MEC management network element sends status information of the new VM to the RAN control plane.

For example, the status information of the new VM includes a working status of the new VM, and the working status of the new VM includes a startup state and a normal state.

Step 314: The RAN control plane receives the status information, of the new VM, sent by the MEC management network element.

If determining that the working status of the new VM is the startup state, the RAN control plane continues to wait for the MEC management network element to send the status information of the new VM next time; and if determining that the working status of the new VM is the normal state, the RAN control plane encapsulates the status information into a second RRC message sent to the UE, where a type field value in the second RRC message is set to an MEC response type.

Step 315: The RAN control plane sends the second RRC message to the UE through the RAN forwarding plane.

Specifically, the second RRC message further includes the IP and the port number of the new VM, and the like.

Step 316: The user equipment sends data related to the MEC application service to the RAN forwarding plane.

Step 317: The RAN forwarding plane forwards, according to rules in the second flow table, the data related to the MEC application service to the new VM on the MEC server.

In this embodiment of this application, the newly added MEC management network element creates the new VM on the MEC server for the user equipment, to implement the MEC application service request of a user. An RRC protocol is extended, so that the MEC application service request message sent by the user equipment can be correctly parsed. The RAN control plane parses the MEC application service request of the user, and performs a related procedure. Through the foregoing improvement, the MEC application service can be flexibly and efficiently provided for the user equipment.

Figure 4A:
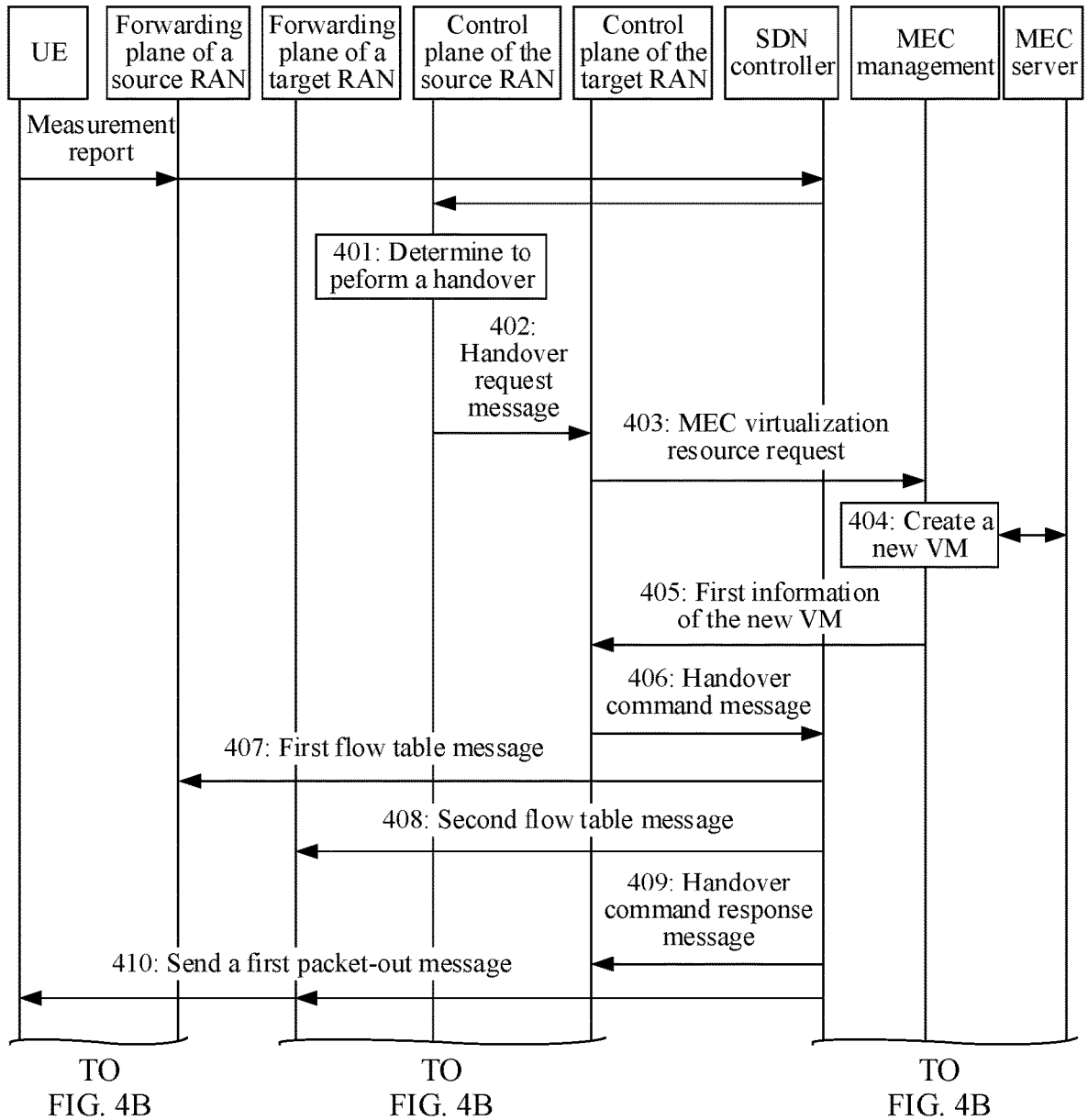
FIG. 4A and FIG. 4B are a flowchart of another mobile edge computing method according to this application.
Figure 4B:
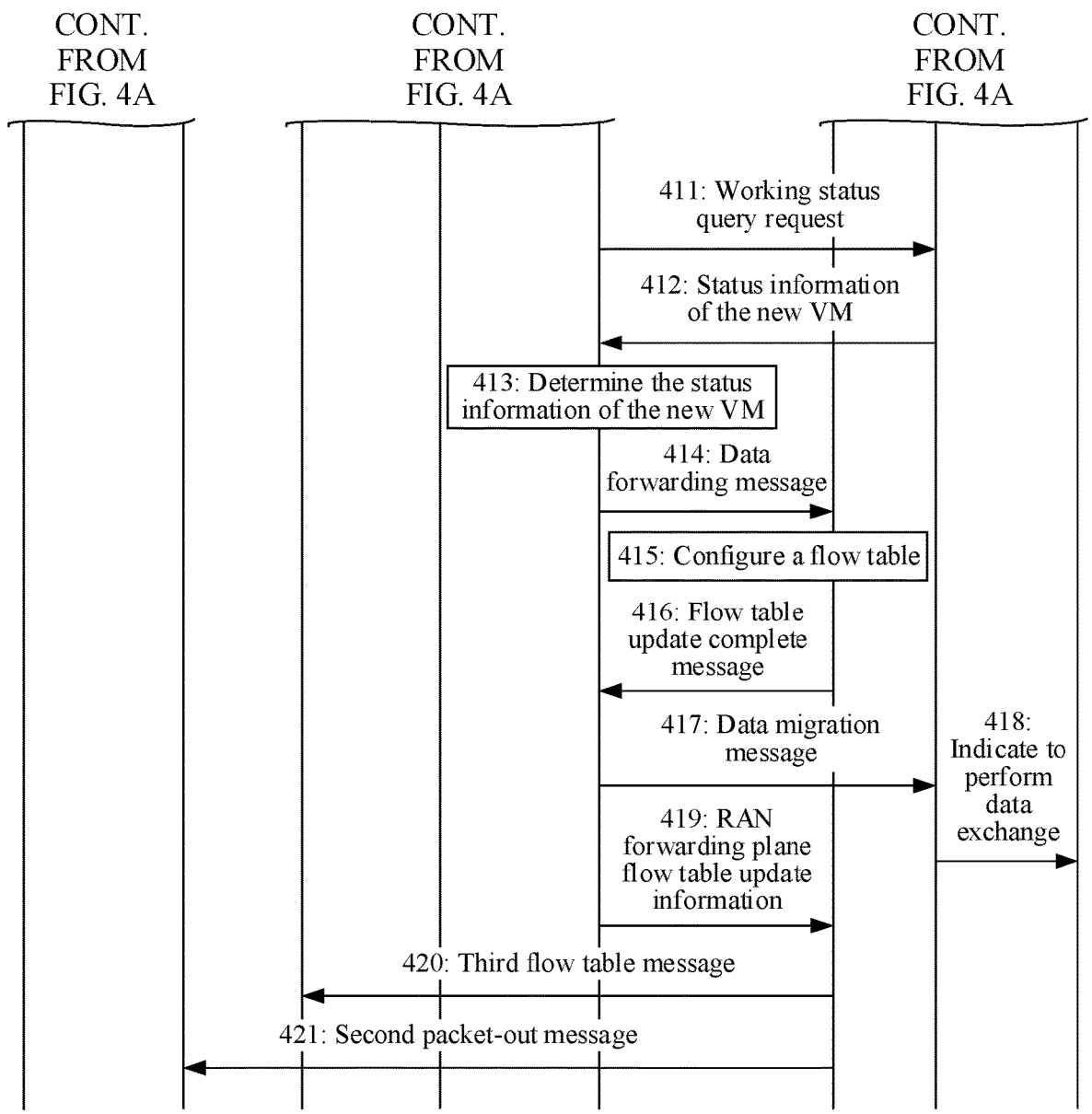

When the UE is using the MEC application service, if the UE needs to be handed over from a base station to another base station, a most important problem to be resolved in this application is how to ensure service continuity and avoid a waste of resources in the prior art. When the handover of the UE from a base station to another base station when the UE is using the MEC application service is implemented based on the new network architecture proposed in FIG. 2, before the UE is handed over between the base stations, the MEC management network element creates a new VM on the MEC server for the UE. In this way, the service continuity can be ensured, and the waste of resources in the prior art can be avoided. The following describes in detail, by using a complete embodiment, a mobile edge computing method proposed in this application. A control plane of a source RAN and a forwarding plane of the source RAN belong to a base station from which UE is handed over, and a control plane of a target RAN and a forwarding plane of the target RAN belong to a base station to which the UE is handed over. Specific steps are shown in FIG. 4A and FIG. 4B.

Step 401: The control plane of the source RAN receives a measurement report sent by the UE, and determines to execute a handover.

For example, after the UE sends the measurement report, the measurement report is forwarded to the control plane of the source RAN through the forwarding plane of the source RAN and an SDN controller.

Step 402: The control plane of the source RAN sends a handover request message to the control plane of the target RAN.

The handover request message includes MEC context information, and the MEC context information is specifically an IP and a port number of an old VM on an MEC server on the source RAN side, an MEC computing resource requirement of the UE, and the like.

Step 403: The control plane of the target RAN sends, based on the handover request message, an MEC virtualization resource request to a mobile edge computing MEC management network element.

The MEC virtualization resource request includes the MEC computing resource requirement of the user equipment, and specifically includes a CPU size, a memory size, a disk size, and the like.

Step 404: The MEC management network element creates, based on the MEC virtualization resource request and monitored resource usage on the MEC server, a new virtual machine VM on the MEC server for the user equipment.

Specifically, the new VM is a VM used on the target RAN side after the user equipment is handed over.

Step 405: The MEC management network element sends first information of the new VM to the control plane of the target RAN.

In a possible implementation, the first information includes an ID of the new VM, and the first information further includes an IP and a port number of the new VM, and the like.

Step 406: The control plane of the target RAN sends a handover command message to the software-defined networking SDN controller.

The handover command message includes an IP address of the target RAN, and the handover command message is used to indicate to hand over the user equipment from the source RAN side to the target RAN side.

Step 407: The SDN controller sends a first flow table (Flow mod) message to the forwarding plane of the source RAN.

Specifically, the first flow table message is used to indicate to forward, to the corresponding new virtual machine VM on the target RAN side, data that is received from the old VM before the handover, and forward, to the corresponding old VM on the source RAN side, an MEC application data packet that is sent by the user equipment UE and that is received from the control plane of the target RAN.

Step 408: The SDN controller sends a second flow table message to the forwarding plane of the target RAN.

The second flow table message is used to indicate to forward, to the corresponding old VM on the source RAN side, MEC application data that is not completely uploaded before the handover, and forward the data of the corresponding old VM on the source RAN side to the UE.

Step 409: The SDN controller sends a handover command response message to the control plane of the target RAN.

Step 410: The SDN controller sends a first packet-out message to the UE.

The first packet-out message carries data of an RRC reconf message, and the RRC reconf message is sent to the UE through the forwarding plane of the RAN, where the RRC reconf message includes radio resource control RRC parameter configuration information. A switch of the forwarding plane of the target RAN receives the first packet-out message, and the message is sent to a PDCP entity over a port specified in the message and then sent to the UE.

Step 411: The control plane of the target RAN sends an MEC VM working status query request to the MEC management network element.

The MEC VM working status query request includes the ID of the new VM.

Step 412: The MEC management network element queries for status information of the new VM based on the ID of the new VM, and the MEC management network element sends the status information of the new VM to the control plane of the target RAN.

The status information includes a startup state and a normal state. The MEC management network element obtains the status information of the VM on the MEC server by subscribing to a VM status event. When a working status of the VM on the MEC server changes, the working status is reported to the MEC management network element, or the working status is periodically reported to the MEC management network element. A specific reporting manner is not limited in this embodiment of this application. The status event of the VM includes a correspondence between the ID of the new VM and the status information of the VM.

Step 413: The control plane of the target RAN determines, based on the received status information of the new VM, whether to perform a next step. Specifically, if the new VM is determined to be in the startup state, no processing is performed; or if the VM is determined to be in the normal state, the next step is performed.

Step 414: The control plane of the target RAN sends a data forwarding message to the SDN controller.

For example, the data forwarding message includes an IP address of the old VM and an IP address of the new VM, and is used to indicate the SDN controller to forward, to the new VM, data sent to the old VM.

Step 415: The SDN controller sends a flow table message to a switch between the new VM and the old VM, to configure a flow table.

The flow table message is used to indicate the UE to send, to the new VM for processing, MEC application data that is not uploaded, and indicate to send, to the UE, data from the new VM.

Step 416: The SDN controller sends a flow table update complete message to the control plane of the target RAN. Specifically, the flow table update complete message is used to notify the control plane of the target RAN to notify the MEC management network element to perform data migration.

Step 417: The control plane of the target RAN sends a data migration message to the MEC management network element.

In a possible implementation, the data migration message is used to indicate the MEC server to replace the old VM with the new VM in performing data exchange between the user equipment and the target RAN.

Step 418: The MEC management network element sends the data migration message to the MEC server, to indicate the MEC server to replace the old VM with the new VM in performing data exchange between the user equipment and the target RAN.

Step 419: The control plane of the target RAN sends RAN forwarding plane flow table update information to the SDN controller.

Specifically, the RAN forwarding plane flow table update information is used to indicate the SDN controller to indicate the forwarding plane of the target RAN to forward data between the user equipment and the new VM.

Step 420: The SDN controller sends a third flow table message to the forwarding plane of the target RAN.

Specifically, the SDN controller sends the third flow table message to the switch of the forwarding plane of the target RAN, where the third flow table message is used to configure two flow tables: an uplink flow table used to receive the MEC application data that is not completely uploaded before the handover and forward the MEC application data to the new VM, and a downlink flow table used to forward, to the UE, data from the new VM.

Step 421: The SDN controller sends a second packet-out message to the forwarding plane of the source RAN, where the second packet-out message is used to indicate the user equipment that transmission of data to the old VM is completed.

Compared with the prior art, in this embodiment of this application, the MEC management network element for managing a virtualization resource of the MEC server is added, and the MEC management network element creates, based on the received MEC virtualization resource request sent by the control plane of the RAN, the new VM on the virtualization resource of the MEC server for the user equipment, to continue to provide the MEC application service for the user equipment on the new VM. In addition, the MEC management network element sends the first information of the new VM to the control plane of the target RAN. In this way, when the user equipment is handed over in a process of using the MEC application, the user equipment can be automatically handed over to the new VM on the target RAN side without affecting service continuity. This reduces a transmission latency and improves user experience.

Figure 5:
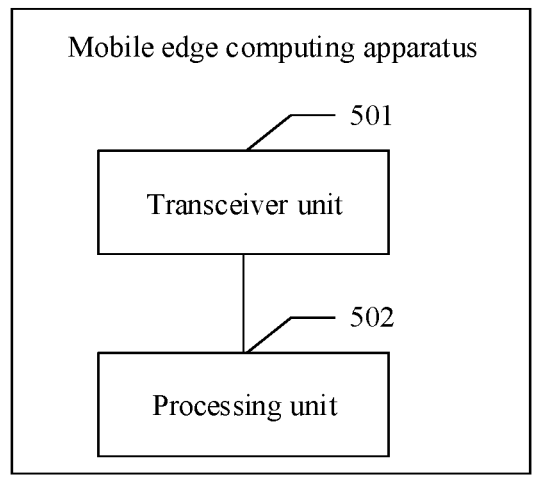
FIG. 5 is a schematic diagram of a mobile edge computing apparatus according to this application.

Based on a same inventive concept as that of the method embodiment, this application further provides a schematic diagram of a mobile edge computing apparatus. As shown in FIG. 5, the apparatus includes a transceiver unit 501 and a processing unit 502. The transceiver unit 501 is configured to receive an MEC virtualization resource request sent by a control plane of a target radio access network RAN, where the control plane of the target RAN belongs to the target RAN to which user equipment is handed over, and the MEC virtualization resource request includes an MEC computing resource requirement of the user equipment; the processing unit 502 is configured to create, based on the MEC virtualization resource request, a new virtual machine VM on an MEC server for the user equipment, where the new VM is a VM used on the target RAN side after the user equipment is handed over; and the transceiver unit 501 is further configured to send first information of the new VM to the control plane of the target RAN, where the first information includes an ID of the new VM. In a possible implementation, the transceiver unit 501 and the processing unit 502 are further configured to perform operations performed by the MEC management network element in the foregoing embodiments.

In an embodiment of this application, a schematic diagram of two mobile edge computing apparatuses is further provided. The schematic diagram is the same as the schematic diagram in FIG. 5, but represents a structure of a control plane of an RAN or an SDN controller. Specifically, the transceiver unit 501 and the processing unit 502 are alternatively configured to perform operations performed by the control plane of the RAN or the SDN controller in the foregoing embodiments.

In the embodiments of this application, division into modules is an example and is merely logical function division. In actual implementation, another division manner may be used. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 6:
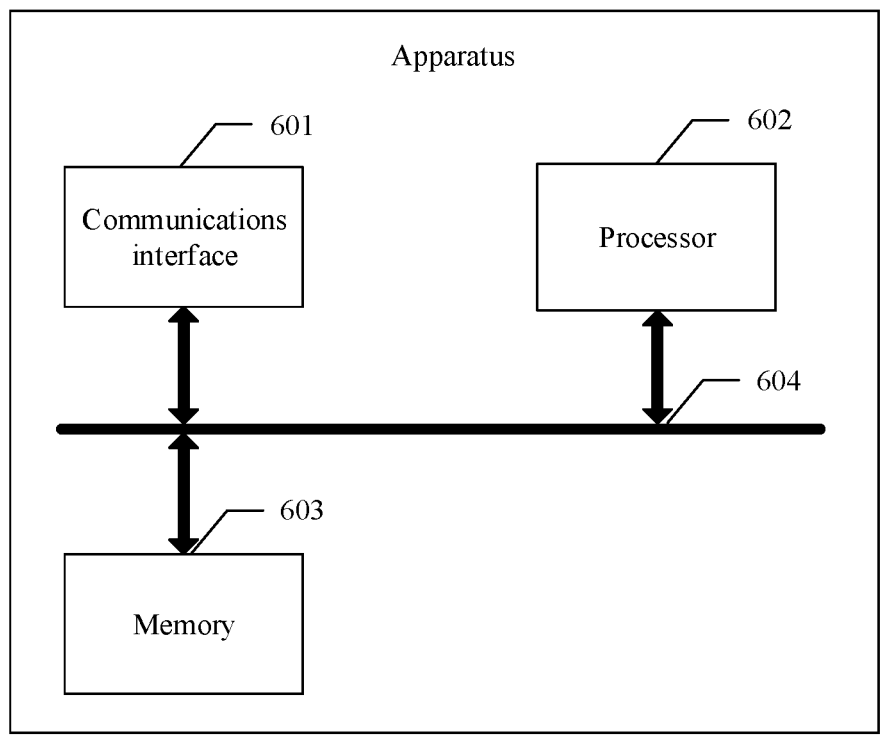
FIG. 6 is a structural diagram of hardware of an apparatus according to this application.

When the integrated module is implemented in a form of hardware, as shown in FIG. 6, an apparatus may include a processor 602. Hardware of an entity corresponding to the processing unit 502 may be the processor 602. The processor 602 may be a central processing unit (CPU), a digital processing module, or the like. The device may further include a communications interface 601 (which may be a transceiver), and a hardware entity corresponding to the transceiver unit 501 may be the communications interface 601. The device may further include a memory 603, configured to store a program executed by the processor 602. The memory 603 may be a non-volatile memory such as a hard disk drive (HDD), or a solid-state drive (SSD), or may be a volatile memory such as a random-access memory (RAM). The memory 603 is any other medium capable of carrying or storing expected program code in a form of instructions or data structures and capable of being accessed by a computer, but is not limited thereto.

The processor 602 is configured to execute the program code stored in the memory 603, and is specifically configured to perform the method according to the embodiment shown in FIG. 3 or FIG. 4A and FIG. 4B. Reference may be made to the method according to the embodiment shown in FIG. 3 or FIG. 4A and FIG. 4B, and details are not described in this application again.

A specific connection medium between the foregoing communications interface 601, processor 602, and memory 603 is not limited in this embodiment of this application. In this embodiment of this application, in FIG. 6, the memory 603, the processor 602, and the communications interface 601 are connected by using a bus 604. The bus is represented by using a thick line in FIG. 6. A connection manner between other components is merely an example for description, and is not limited thereto. The bus may be classified into an address bus, a data bus, a control bus, or the like. For ease of representation, only one thick line is used to represent the bus in FIG. 6, but this does not mean that there is only one bus or only one type of bus.

An embodiment of the present invention further provides a computer-readable storage medium, configured to store a computer software instruction to be executed by the processor, and the computer-readable storage medium includes a program to be executed by the foregoing processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

In this application, the term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects.

In this application, "at least one" means one or more, and "a plurality of" means two or more than two. "At least one item (piece) of the following" or a similar expression thereof refers to any combination of these items, including any combination of singular items (pieces) or plural items (pieces). For example, "at least one item (piece) of a, b, or c" or "at least one item (piece) of a, b, and c" may indicate: a, b, c, a-b (that is, a and b), a-c, b-c, or a-b-c, where a, b, and c may be singular or plural.

It should be understood that, in the embodiments of this application, sequence numbers of the foregoing processes do not mean execution sequences. Some or all steps may be executed in parallel or in sequence. The execution sequences of the processes should be determined based on functions and internal logic of the processes, and should not be construed as any limitation on the implementation processes of the embodiments of this application.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A mobile edge computing method comprising:
   receiving, by a mobile edge computing (MEC) management network element, an MEC virtualization resource request sent by a control plane of a target radio access network (RAN), wherein the control plane of the target RAN belongs to the target RAN to which user equipment is handed over, and the MEC virtualization resource request comprises an MEC computing resource requirement of the user equipment;
   determining, by the MEC management network element, based on the MEC virtualization resource request, that the UE does not have a corresponding virtual machine (VM) on an MEC server which the MEC management network element is associated with;
   upon the determination, creating, by the MEC management network element based on the MEC virtualization resource request, a new VM on the MEC server for the user equipment, wherein the new VM is a VM used on the target RAN side after the user equipment is handed over; and
   sending, by the MEC management network element, first information of the new VM to the control plane of the target RAN, wherein the first information comprises an identification (ID) of the new VM.

2. The method according to claim 1, further comprising:
   receiving, by the MEC management network element, an MEC VM working status query request sent by the control plane of the target RAN, wherein the MEC VM working status query request comprises the ID of the new VM;
   querying, by the MEC management network element, for status information of the new VM based on the ID of the new VM, wherein the status information comprises a startup state and a normal state; and
   sending, by the MEC management network element, the status information of the new VM to the control plane of the target RAN.

3. The method according to claim 2, wherein before querying for the status information of the new VM based on the ID of the new VM, the method further comprises:
   receiving, by the MEC management network element, a VM status event reported by the MEC server, wherein the VM status event comprises a correspondence between the ID of the new VM and the status information of the VM.

4. The method according to claim 1, further comprising:
   receiving, by the MEC management network element, a data migration message sent by the control plane of the target RAN, wherein the data migration message indicates the MEC server to replace an old VM with the new VM in performing data exchange between the user equipment and the target RAN, and the old VM is a VM used on a source RAN side before the user equipment is handed over; and
   sending, by the MEC management network element, the data migration message to the MEC server, to indicate the MEC server to replace the old VM with the new VM in performing data exchange between the user equipment and the target RAN.

5. A mobile edge computing method comprising:
   receiving, by a control plane of a target radio access network (RAN), a handover request message sent by a control plane of a source RAN, wherein the handover request message comprises a mobile edge computing (MEC) computing resource requirement of user equipment, the control plane of the target RAN belongs to the target RAN to which the user equipment is handed over, and the control plane of the source RAN belongs to the source RAN from which the user equipment is handed over;

sending, by the control plane of the target RAN based on the handover request message, an MEC virtualization resource request to an MEC management network element, wherein the MEC virtualization resource request comprises the MEC computing resource requirement of the user equipment; and receiving, by the control plane of the target RAN, first information, of a new virtual machine (VM), sent by the MEC management network element, wherein the new VM is a new VM created, by the MEC management network element based on the MEC virtualization resource request, on an MEC server for the user equipment upon a determination that the UE does not have a corresponding virtual machine (VM) on an MEC server which the MEC management network element is associated with, the new VM is a VM used on the target RAN side after the user equipment is handed over, and the first information comprises an ID of the new VM.

6. The method according to claim 5, wherein after receiving the first information of a new VM sent by the MEC management network element, the method further comprises:

sending, by the control plane of the target RAN, a handover command message to a software-defined networking (SDN) controller, wherein the handover command message comprises an Internet Protocol (IP) address of the target RAN, and the handover command message indicates to hand over the user equipment from the source RAN side to the target RAN side; and receiving, by the control plane of the target RAN, a handover command response message sent by the SDN controller.

7. The method according to claim 5, further comprising:

sending, by the control plane of the target RAN, an MEC VM working status query request to the MEC management network element, wherein the MEC VM working status query request comprises the ID of the new VM; and receiving, by the control plane of the target RAN, status information, of the new VM, sent by the MEC management network element, wherein the status information comprises a startup state and a normal state.

8. The method according to claim 7, wherein in response to the status information being the normal state, after receiving the status information, of the new VM, sent by the MEC management network element, the method further comprises:

sending, by the control plane of the target RAN, a data forwarding message to a software-defined networking (SDN) controller, wherein the data forwarding message indicates the SDN controller to forward, to the new VM, data sent to the old VM.

9. The method according to claim 8, wherein before sending the data forwarding message to the SDN controller, the method further comprises:

receiving, by the control plane of the target RAN, a flow table update complete message sent by the SDN controller, wherein the flow table update complete message notifies the control plane of the target RAN to notify the MEC management network element to perform data migration.

10. The method according to claim 5, further comprising:

sending, by the control plane of the target RAN, a data migration message to the MEC management network element, wherein the data migration message indicates the MEC server to replace the old VM with the new VM in performing data exchange between the user equipment and the target RAN, and the old VM is a VM used on the source RAN side before the user equipment is handed over; and sending, by the control plane of the target RAN, RAN forwarding plane flow table update information to the SDN controller, to indicate the SDN controller to instruct a forwarding plane of the target RAN to forward data between the user equipment and the new VM.

11. A mobile edge computing apparatus comprising:

a processor; and a memory coupled to the processor and having processor-executable instructions stored thereon, which when executed by the processor cause the apparatus to:

receive a mobile edge computing (MEC) virtualization resource request sent by a control plane of a target radio access network (RAN), wherein the control plane of the target RAN belongs to the target RAN to which user equipment is handed over, and the MEC virtualization resource request comprises an MEC computing resource requirement of the user equipment;

determine, based on the MEC virtualization resource request, that the UE does not have a corresponding virtual machine (VM) on an MEC server which the apparatus is associated with;

upon the determination, create, based on the MEC virtualization resource request, a new virtual machine (VM) on an MEC server for the user equipment, wherein the new VM is a VM used on the target RAN side after the user equipment is handed over; and send first information of the new VM to the control plane of the target RAN, wherein the first information comprises an ID of the new VM.

12. The apparatus according to claim 11, wherein the instructions further cause the apparatus to:

receive an MEC VM working status query request sent by the control plane of the target RAN, wherein the MEC VM working status query request comprises the ID of the new VM;

query for status information of the new VM based on the ID of the new VM, wherein the status information comprises a startup state and a normal state; and send the status information of the new VM to the control plane of the target RAN.

13. The apparatus according to claim 12, wherein before querying for the status information of the new VM based on the ID of the new VM, the instructions further cause the apparatus to:

receive a VM status event reported by the MEC server, wherein the VM status event comprises a correspondence between the ID of the new VM and the status information of the VM.

14. The apparatus according to claim 11, wherein the instructions further cause the apparatus to:

receive a data migration message sent by the control plane of the target RAN, wherein the data migration message indicates the MEC server to replace an old VM with the new VM in performing data exchange between the user equipment and the target RAN, and the old VM is a VM used on a source RAN side before the user equipment is handed over; and send the data migration message to the MEC server, to indicate the MEC server to replace the old VM with the new VM in performing data exchange between the user equipment and the target RAN.

* * * * *